Figure 1:
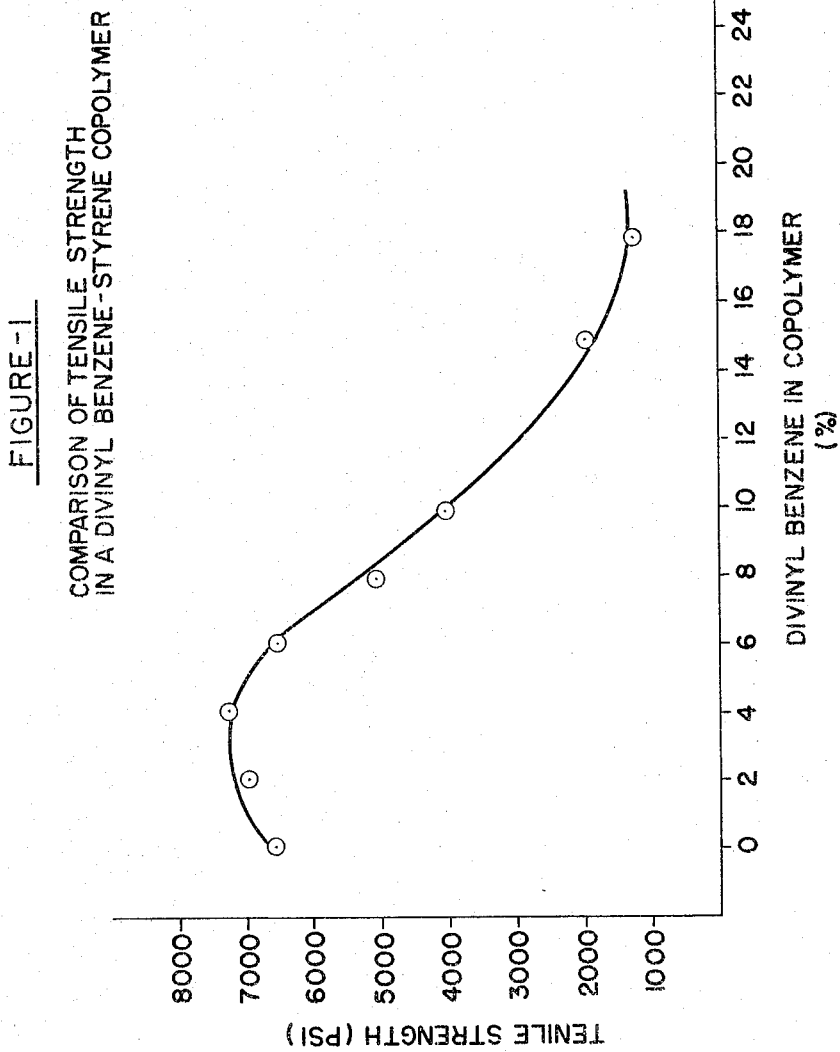

COMPARISON OF TENSILE STRENGTH IN A DIVINYL BENZENE-STYRENE COPOLYMER

Byron M. Vanderbilt   Inventor

By C. D. Stores   Attorney

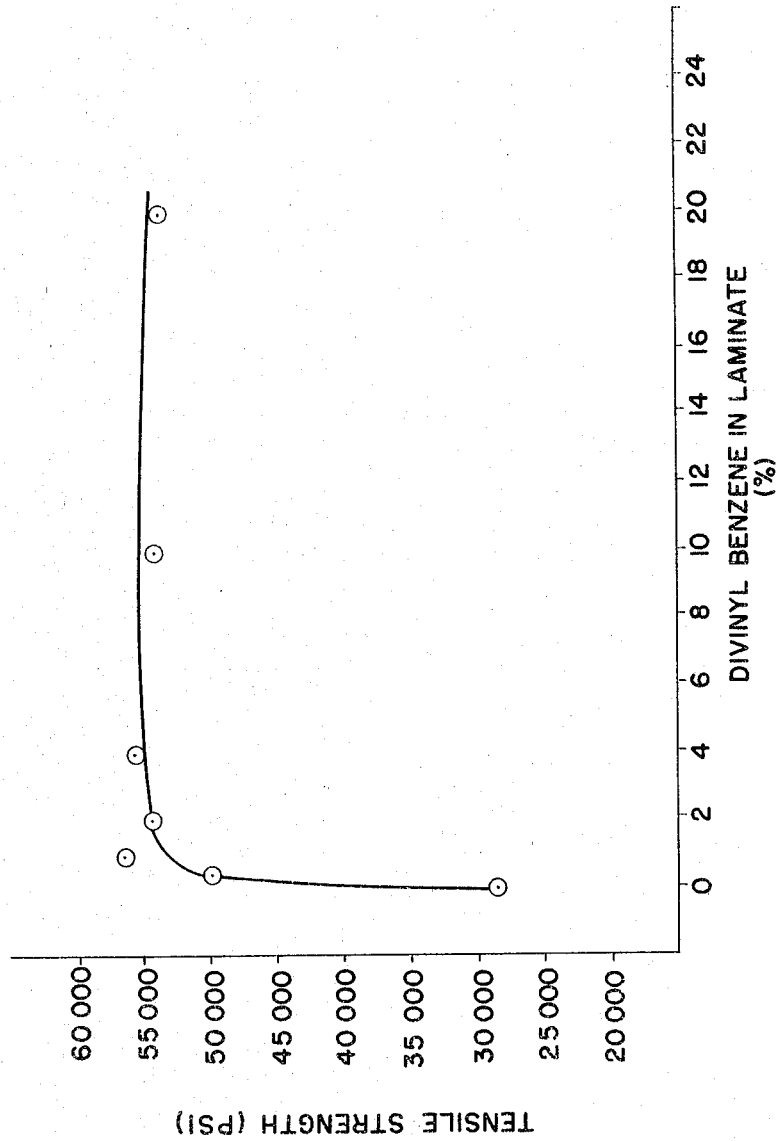

3,301,739
REINFORCED PLASTIC WITH A STYRENE TYPE COPOLYMER AND A REINFORCING ELEMENT THEREIN

Byron M. Vanderbilt, Westfield, N.J., assignor to Esso Research and Engineering Company, a corporation of Delaware
Continuation of application Ser. No. 816,111, May 27, 1959. This application June 21, 1963, Ser. No. 295,579
15 Claims. (Cl. 161—93)

This invention relates to a method for providing a reinforced styrene plastic. More particularly it relates to a unitary laminate comprising a reinforcing element and a copolymer of a styrene with a polyolefinic monomer. This application is a continuation of copending application, Serial No. 816,111, filed May 27, 1959, now abandoned.

A moldable glass-filled polystyrene has been prepared by suspending glass fibers in monomeric styrene and polymerizing the mixture in conjunction with agitation (U.S. Patent No. 2,688,744). Styrene has also been copolymerized with a polyvinyl aromatic hydrocarbon, such as divinyl benzene, in the absence of reinforcing fibers. These copolymers are less soluble in solvents than the corresponding polystyrene and if sufficient divinyl benzene is copolymerized with the styrene, the copolymers therefrom are insoluble in all the usual solvents, e.g., benzene, heptane, and the like. In addition, a monomeric mixture comprising a styrene and divinyl benzene has a relatively low viscosity. These aforementioned characteristics of styrene-divinyl benzene blends and their copolymers are described in Boundy-Boyer: Styrene, Its Polymers, Copolymers and Derivatives; No. 115, Reinhold, 1952, pages 709–732, which is incorporated herein by reference.

There has been no commercial or academic interest in preparing finished articles or structures of a styrene reinforced plastic directly from the monomer since they are nonporous, opaque, and of low physical strength. Furthermore, a satisfactory reinforced structure using fibers, such as glass or asbestos, as roving, matting, or as cloth, has not been prepared by employing a styrene as the resin. Such polymerized mixtures were only of value as unitary objects when molded under high pressure at an elevated temperature. Typical conditions are taught by U.S. Patent 2,688,744 wherein use of a pressure of at least 1000 p.s.i. and a temperature of at least 125° C. were employed. It had been heretofore assumed that a styrene-divinyl benzene laminate would have comparable properties and comparable appearance and, accordingly, would not be suitable as a substitute for polyesters and other resins used in the fabrication of reinforced plastics.

It is also known to provide a glass reinforced laminate comprising dichlorostyrene cured as the homopolymer or in the presence of a crosslinking agent, e.g., divinyl benzene, and a peroxide catalyst, e.g., benzoyl peroxide (Canadian Patent No. 531,185). However, this laminate has not been entirely satisfactory for two reasons. Firstly, the reinforcing element, such as glass, has been limited to mattings and/or fibers. Secondly, the fiber could be used in quantities up to only 50% by weight of the laminate. Because of these two limitations, the laminate therefrom had a relatively low tensile strength. This, therefore, was a serious disadvantage and precluded the utilization of this end product in lieu of the polyester laminate.

It has now been discovered that a strong, translucent reinforced structure can be provided therefrom if as little as about 0.5% of divinyl benzene is blended with the styrene and laminated with glass fibers with a vinyl silane finishing agent thereon. Thus in accordance with one embodiment of this invention, a curable monomeric mix is formed comprising styrene or one of its homologs, a polyvinyl aromatic hydrocarbon, and a peroxide catalyst. A reinforcing element with an organic finishing agent thereon is impregnated with this mix and subsequently cured to a unitary reinforced structure. Thus, for the first time, reinforced plastics have been prepared from monomers which are comparable in strength and appearance to those obtained from resins such as the polyesters, epoxy resins, and liquid polymers of butadiene which have been polymerized in the presence of an alkali metal catalyst.

The reinforcing elements that are applicable to this invention include fibers formed from mineral materials, e.g., glass, asbestos, mica, rock, and celite; vegetable fibers, e.g., cotton, linen, rayon, and silk; organic materials, e.g., hair, nylon, and orlon; and metallic filaments or wire, e.g., iron, aluminum, and copper. Reinforcing elements may now comprise up to 80%, e.g., 35 to 80%, by weight of the reinforced plastic, preferably 60 to 70%. The preferred material is glass fiber. In the present invention, glass fiber is defined as any fibrous glass unit to include filament yarns, rovings, reinforcing mats, staple yarns, woven fabrics, chopped fibers, and flake glass. A protective size is usually applied to glass fibers. Examples of sizes which can be used are as follows: starch-mineral oil mixtures; polyvinyl acetate; polyisobutylene; copolymers of isobutylene with isoprene; and copolymers of butadiene with styrene.

In accordance with this invention, it is necessary to use glass fiber which has been treated with a finishing agent (a coupling agent), usually an unsaturated compound of silicon or chromium. This coating usually constitutes 0.2–0.5% of the weight of the glass. An example is an unsaturated organic halo silane, having the formula $R''nSiX_{4-n}$, wherein $R''$ is a vinyl or allyl group, $n$ is a positive integer equal to 1, 2, or 3, and X is halogen. It is also possible instead of coating the glass fiber to incorporate 0.1 to 5 parts of a vinyl or allyl silane ester in the resinifiable mix which has the general formula $R''nSi(OR''_1)_{4-n}$, wherein $R''$ is an unsaturated group, e.g., vinyl, allyl, methallyl, or crotonyl group; $n$ is a positive integer equal to 1, 2, or 3; and $R''_1$ is an alkyl or aryl group or substitutes thereof. It is believed that the above-described silanes react with the hydroxyl groups in the glass. The unsaturated portion of the molecule, such as the vinyl group, bound to the glass through the silicon atom, reacts with the polymer during the curing step, thus effectively bonding the polymer and the glass fiber. Use of an unsaturated bonding agent, either on the glass surface or in the form of an ester or ether and dissolved in the resin mix when applied to the glass, is a major factor in this invention. The mechanism is not known which makes it possible to prepare an excellent reinforced plastic from a relatively low amount, e.g., 0.5%, of divinyl benzene dissolved in the styrene monomer. Although bonding agents of the vinyl-silane type are preferred, a methacrylic acid complex prepared by coordination with chromium chloride is also effective. This coupling or bonding agent is sold under the trade name of Volan.

In accordance with this invention, a resinifiable mix is prepared comprising styrene or a homolog thereof, a polyvinyl aromatic hydrocarbon, and a peroxide catalyst. Styrene, which is known in the art, can be prepared by any one of numerous methods such as by alkylation of benzene with ethylene with subsequent dehydrogenation of the purified ethyl benzene therefrom in the presence of steam. It is also within the purview of this invention to utilize a styrene compound which has been modified to incorporate alkyl groups and/or halogen groups therein as shown generically in the structure herebelow:

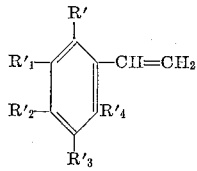

wherein R, $R_1$, $R_2$, $R_3$, and $R_4$ may be the same or different groups and are therefore independently selected from the group consisting of hydrogen, halogens, and alkyl radicals containing not more than eighteen carbon atoms. Other aromatic nuclei besides the benzene group are applicable, such as the naphthalene, bisphenyl, biphenyl, and other condensed ring groups. Specific compounds within this genus include the following: ortho-methyl styrene, meta-methyl styrene, para-methyl styrene, ortho-ethyl styrene, para-ethyl styrene, 2,4-dimethyl styrene, 2,3-dimethyl styrene, 2,5-dimethyl styrene, para-tertiary-butyl styrene, ortho-chlorostyrene, meta-chlorostyrene, para-chlorostyrene, 2,4,6-trichlorostyrene, mono-, di-, and tri-fluorostyrenes, 1,4-diethyl styrene, 1-methyl-4-chlorostyrene, m-bromostyrene, o-bromostyrene, p-bromostyrene, 2,4-dichlorostyrene, 2,5-dichlorostyrene, 2,6-dichlorostyrene, dibromostyrenes, and mixtures thereof. A styrene compound generally comprises 99.5 to 70 parts per 100 parts of the total mix.

In the present invention, a polyolefinic compound is incorporated in the resinifiable polymeric mix. The polyvinyl compounds within the purview of this invention are those which have the general structure as indicated herebelow:

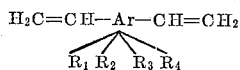

wherein $R_1$, $R_2$, $R_3$, and $R_4$ are each independently selected from the group consisting of hydrogen, halogens, alkyl groups, and a vinyl group; and Ar is an aromatic nucleus such as that of benzene, naphthalene, biphenyl, and phenanthrene. Specific examples are divinyl benzene, divinyl toluene, divinyl xylene, divinyl naphthalene, and trivinyl benzene. The especially preferred compound is divinyl benzene. It should be noted, however, that a wide range, e.g., 0.5 to 25 parts, of concentration of the divinyl benzene may be employed, and that in order to obtain high-strength reinforced structures, it is not necessary to restrict the use of the divinyl benzene to a maximum of 3–5% as is the case when preparing cast styrene-divinyl benzene copolymers. The divinyl benzene (or styrene) may be partially polymerized before it is added to the resinifiable mix. This serves to adjust the viscosity of the mix to any desired value. If this procedure is used, it is preferred to add 0.5 to about 10 parts of the polymer to 100 parts of the monomeric mix. Polymers of at least 100,000 molecular weight, and preferably at least 500,00, are generally employed. It may also be advantageous to include 0.5 to 50 parts of vinyl and/or allyl esters of a polybasic acid or acrylic and/or methacrylic acid esters of polyhydric alcohols in the mix in lieu of the divinyl aromatic compounds heretofore described. Examples of these esters are diallyl phthalate, triallyl acetyl citrate, triallyl cyanurate, divinyl phthalate, diallyl fumarate, vinyl methacrylate, ally methacryate, ethylene glycol dimethacrylate, diethylene glycol diacrylate, and mixtures thereof.

A catalyst is also incorporated in the resinifiable mix, generally within the range of 0.1 to 3 parts. The preferred catalysts are the free radical or peroxide type; therefore, all peroxides, hydroperoxides, per-esters, and per-acids are applicable. Benzoyl peroxide is preferred for relatively low temperature reactions, whereas dicumyl peroxide is preferred for high temperature reactions.

It is also within the purview of this invention to incorporate in the resinifiable mix 0 to 15 parts, preferably 0.5 to 5.0 parts, of a high molecular weight rubber, e.g., butadiene polymers and copolymers, natural rubber, polyisoprene, butyl rubber, and the like. This serves to adjust the viscosity of the styrene-divinyl mixture to any desired value. Natural rubber, such as the so-called pale crepe grade, is preferred. High molecular weight plastics of at least 200,000 molecular weight are also applicable. Polystyrene prepared by polymerization in emulsion and having a molecular weight of at least 1,000,000 is particularly applicable. It is also possible to include fillers such as divided silicas, glasses, clays, and carbon blacks in the mix. Such materials serve to adjust viscosity as well as to impart other valuable characteristics.

The reinforcing agent is then laminated with the resinifiable mix. A laminate, according to this invention, is defined as a composite mass of a reinforcing element and a liquid monomeric mixture which has set to a hard reinforced substance. The set resin may be thermoplastic in nature, it may soften somewhat before molecular breakdown when heated, or it may be substantially nonthermoplastic in nature. This, therefore, includes layers of cloth and resin; fibers embedded in a resin; and fibers in the form of rovings or strands which are saturated with resin and formed in a hollow cylindrical pipe or other directionally wound object. Accordingly, the bonding of the monomeric mixture to the reinforcing element can be accomplished by any known method. Furthermore, the bonded material can be set to any desired shape by layup, molding, or the like. For example, the resin mix can be combined with glass cloth by brush impregnation; by being poured into the center of several piles of dry cloth assembled on cellophane-covered glass plate; and by dipping the cloth into the resin mix. Thus one method used in the manufacture of solid rectangular laminates is to form layers of the resinifiable mix and glass fiber. After the desired thickness is obtained, the sheet is cured to a unitary reinforced plastic. Another method can be used for the manufacture of cylindrical hollow pipes or ducts. Glass fibers can be dipped in the curable monomer mix and wound about a steel mandrel. This can be accomplished by any known method. In one method, the fiber rovings, e.g., glass fibers, are wound at an angle to the axis of the mandrel circumferentially in superimposed layers to form a peripheral shell of the pipe as per U.S.P. 2,714,414. After the desired shape is obtained, the wrapping can be cured to form the unitary rigid pipe.

The reinforcing elements laminated with the resinifiable monomeric mix are subsequently cured by any known method. A suitable method is by baking in a press mold at a temperature between room temperature and 300° F. for between 1 minute and 2 hours. A postcure, if desired, may then be employed at a temperature between 250° and 400° F. for 1 to 10 hours.

Thus in accordance with this invention, it is now possible to provide a reinforced plastic comprising a reinforcing element and a copolymer of a styrene-type compound with a divinyl benzene-type compound. In contrast to the results obtained by laminating a styrene-divinyl benzene mix with a relatively low percentage of glass fiber without an organic finishing agent thereon, these copolymer laminates have high strength and excellent appearance. It should be noted that laminates, which are prepared from different types of copolymers, may have certain specific advantages. For example, the copolymer of an alkyl styrene with a polyvinyl aromatic hydrocarbon, e.g., divinyl benzene, will provide a laminate with improved physical properties at elevated temperatures as compared to using simple styrene with the same proportion of divinyl benzene. A reinforced laminate prepared from the copolymer of a halogenated styrene with divinyl benzene is fire resistant and has superior strength at both ordinary and high temperatures. In addition, if a copolymer of a styrene with a dimethacrylate ester of a glycol is laminated with a reinforcing element, the end product therefrom will have superior high temperature characteristics.

The following examples are submitted to illustrate and not to limit this invention. Unless otherwise indicated, all parts and percentages are based on weight.

*Example 1*

Three resinifiable mixes were prepared with the compounds included therein as shown in Table I. Fourteen layers of 181 glass cloth with a finishing agent thereon (coupling agent—a vinyl silane ester of the monomethyl ether of ethylene glycol) were impregnated with mix A, and fourteen layers were similarly impregnated with B and C. The saturated glass cloths were then placed in a ⅛″ cavity mold and subjected to curing and postcuring an indicated in Table I to provide laminates A, B, and C. The flexural strength of each of the laminates was determined and the effect of methyl ethyl ketone on each laminate was noted.

TABLE I

|  | A | B | C |
|---|---|---|---|
| Compounds (parts by weight): |  |  |  |
| o-Methyl styrene | 33 | 33 | 33. |
| m-Methyl styrene | 2 | 2 | 2. |
| p-Methyl styrene | 65 | 65 | 65. |
| Dicumyl peroxide | 1 | 1 | 1. |
| Divinyl benzene |  |  | 2. |
| Temperature of cure | 275° F. | 275° F. | 275° F. |
| Time for cure (hrs.) | 1 | 1 | 1. |
| Temperature of postcure |  | 300° F. | 300° F. |
| Time for postcure (hrs.) |  | 2 | 2. |
| Appearance | Poor and porous. | Swelled to 3 times original size. | Translucent. |
| Flexural strength (p.s.i.) (room temperature) | 52,000 | Nil | 68,000. |
| Flexural strength (250° F.) | 1,500 |  | 11,000. |
| Immersed in methyl ethyl ketone. | Completely disintegrated. |  | Hard, no swelling. |
| Immersed in Varsol, a mineral solvent. | ___do___ |  | Do. |

This example demonstrates that the copolymer laminate is substantially superior to the homopolymer laminate in all respects. This is indeed surprising and the effect is much greater than one would predict when compared with copolymers of styrenes with 2% of divinyl benzene, as per Styrene, Its Polymers, Copolymers and Derivatives, Boundy-Boyer, supra, p. 25.

*Example 2*

The following compounds were employed to form a resinifiable mix: 96 parts of monomeric styrene, 2 parts of divinyl benzene dissolved in 2 parts of ethyl vinyl benzene, 0.5 parts of A–172 (a vinyl silane ester of the monomethyl ethyl of ethylene glycol); and 1 part of dicumyl peroxide. Fourteen layers of 181 glass cloth, containing A–172 vinyl silane as a finishing agent, were saturated with this resinifiable mix. The saturated layers were placed in a ⅛″ deep mold under pressure at 275° F. for 1 hr. The flexural strength of the resulting laminate was 74,500 p.s.i. and contained 68% glass. This example shows that a hard laminate of high strength can be obtained by utilizing a styrene-divinyl benzene copolymer.

*Example 3*

A resinifiable mix was prepared as indicated in Table II. Fourteen plies of A–172 silane-coated 181 glass cloth were impregnated with resin mix D. The saturated plies were placed in a mold and subjected to curing as shown in Table II. Laminate D therefrom had a thickness of 0.15 inch and contained 60% glass. The physical properties of the laminate were subsequently determined.

TABLE II

|  | D |
|---|---|
| Compounds: |  |
| Dichlorostyrene monomer | 92. |
| Dichlorostyrene polymer |  |
| Divinyl benzene | 3. |
| Ethyl vinyl benzene | 3. |
| A–172 vinyl silane | 0.5. |
| Dicumyl peroxide | 1.0. |
| Temperature of cure | 260° F. |
| Time for cure (hrs.) | 1. |
| Temperature of postcure | 300° F. |
| Time for postcure (hrs.) | 2.5. |
| Flexural strength at room temperature (p.s.i.) | 62,000. |
| Flexural strength at 170° F. (p.s.i.) | 59,000. |
| Flexural strength at 250° F. (p.s.i.) | 29,000. |
| Fire resistance | Excellent. |
| Appearance | Clear. |
| Life in water at 170° F. under stress (hrs.)* | 1–29 hrs. |

*A sample ½ x ⅛ x 3 inches placed under 29,500 p.s.i. stress under water for 1 hour, and then the stress was increased to 38,500 p.s.i. and held until failure.

The proportion of divinyl benzene can be as high as 10% and even up to 20–25%, and flexural and tensile strengths are increased at elevated temperatures. More recent data show that the opaqueness at high divinyl benzene concentrations is due to saturated impurities in the divinyl benzene. Use of a recent divinyl benzene shipment containing only 2.4% diethyl benzene results in clear laminates even when using up to 20% divinyl benzene.

*Example 4*

Laminates F, G, H, and I were provided in a similar manner as described in Example 3 with the compounds and curing conditions as shown in Table III.

TABLE III

|  | F | G | H | I |
|---|---|---|---|---|
| Compounds: |  |  |  |  |
| Methyl styrene | 100 | 100 |  |  |
| Styrene |  |  | 80 | 80 |
| Divinyl benzene | 2 | 2 | 10 | 10 |
| Ethyl vinyl benzene | 2 | 2 | 10 | 10 |
| A–172 silane | 0.5 | 0.5 |  |  |
| Dicumyl peroxide | 1 | 1 | 1 | 1 |
| Ditertiary butyl peroxide |  |  | 1 | 1 |
| Pale crepe rubber | 2 |  |  |  |
| Polystyrene |  | 2 |  |  |
| Butadiene-styrene rubber |  | 2 | 4 | 4 |
| Temperature of cure, °F | 275 | 275 | 285 | 285 |
| Time for cure (hrs) | 1 | 1 | 1 | 1 |
| Temperature of postcure, °F |  |  | 300 | 320 |
| Time for postcure (hrs) |  |  | 2 | 2 |
| Flexural strength (p.s.i.) | 65,000 | 63,000 | 62,000 | 62,000 |
| Appearance | (*) | (*) | (*) | (*) |

*Translucent.

As demonstrated by the above data, a rubbery polymer can be advantageously incorporated in the monomeric mix.

*Example 5*

A monomeric mix was formed with the following compounds therein:

| Compounds: | Parts by weight |
|---|---|
| Methyl-styrene | 100 |
| Dicumyl peroxide | 1 |
| Divinyl benzene | 2 |

Glass-fiber matting (216E) containing a vinyl silane finish was saturated with the above mix and placed in a mold with subsequent curing at 275° F. for 1 hour. The flexural strength of the laminate therefrom was determined to be 29,500 p.s.i. This strength is comparable to the value obtained for a polyester-styrene laminate prepared with a like proportion of glass matting.

*Example 6*

Monomeric mixes J and K were prepared as shown in Table IV. Fourteen layers of 181 glass cloth, coated with a No. 136 (A-172) vinyl silane finish, were impregnated with mix J and fourteen layers were similarly impregnated with mix K. The saturated layers of cloth were placed in a mold and cured for 1 hour at 275° F. with a postcure at 300° F. for 12 hours. The flexural strength of the resulting laminates were determined as indicated in Table IV.

TABLE IV

|  | J | K |
|---|---|---|
| Compounds: |  |  |
| Methyl styrene | 98 | 74 |
| Dimethyl styrene |  | 23.5 |
| Divinyl benzene | 2.1 | 2.1 |
| A-172 vinyl silane | 0.5 | 0.5 |
| Dicumyl peroxide | 1 | 1 |
| Flexural strength at 72° F. (p.s.i.) | 64,000 | 67,000 |
| Flexural strength at 170° F. (p.s.i.) | 54,000 | 57,000 |
| Flexural strength at 250° F. (p.s.i.) | 11,000 | 23,500 |

Laminate K illustrates the advantage of using a dimethyl styrene in the mix, resulting in a substantial increase in strength at 250° F. In general, dimethyl styrenes are superior to styrene or the monomethyl styrenes.

*Example 7*

The following recipe for a monomeric mix was used to provide laminates L and M therefrom:

Compounds: Parts
Methyl styrene _____ 99.0
Divinyl benzene _____ 0.5
Ethyl vinyl benzene _____ 0.5
Dicumyl peroxide _____ 1.0

Fourteen layers of 181 glass cloth with 136 silane finish thereon were impregnated with this mix and cured for 1 hr. at 275° F. in a ⅛″ pressed mold. A laminate of excellent clarity and free of bubbles and imperfections containing 70% glass was obtained. It was cut in half to form laminates L and M. Laminate M was subjected to a temperature of 300° F. in a hot air oven for 2 hours. The flexural strength and resistance to hot water for both laminates were determined as indicated herebelow:

|  | L | M |
|---|---|---|
| Flexural strength, room temperature (p.s.i.) | 68,000 | 68,500 |
| Flexural strength, 170° F. (p.s.i.) | 56,000 | 54,000 |
| Flexural strength, 250° F. (p.s.i.) | 4,500 | 5,000 |
| Resistance to hot water (hrs.) | 1-5¾ | 1-5½ |

The above data demonstrates that the laminates so prepared may have excellent strength at temperatures up to at least 170° F., but at 250° F. the laminates are substantially thermoplastic. Heating at 300° F. where laminate M was substantially plastic failed to have a harmful effect on its physical properties. Also, in comparison with Example 1, the addition of 0.5% of divinyl benzene results in a 30% increase in strength as well as improved clarity and resistance to heat. This is surprising in view of the negligible effect one would have previously expected from the copolymerization of divinyl benzene with styrene (Styrene, Its Polymers, Copolymers and Derivatives, supra, p. 725, curve 2).

*Example 8*

A monomeric mix was formed from the compounds listed herebelow:

Compounds: Parts
Methyl styrene _____ 66
Diethyl fumarate _____ 30
Divinyl benzene _____ 2
Ethyl vinyl benzene _____ 2
A-172 silane _____ 0.5
Dicumyl peroxide _____ 1.0

Fourteen layers of cloth, as per Example 6, were impregnated with the above mix and placed in a ⅛″ pressed mold for 1 hr. at 260° F. The laminate therefrom possessed outstanding clarity; had excellent weatherability characteristics; and had a flexural strength of 60,000 p.s.i. at room temperature. This example indicates that a minor part of the styrene monomer can be replaced by a fumarate ester. Other monomeric compounds which may be substituted for a minor proportion of the styrene include the acrylates, methacrylates, monovinyl esters, and the mono-allyl esters.

*Example 9*

Fourteen layers of glass cloth, as per Example 6, were coated with a mix comprising the following compounds: 96 parts of dichlorostyrene; 2 parts of divinyl benzene; 2 parts of vinyl ethyl benzene; 1.8 parts of 75% methyl ethyl ketone peroxide; and 0.5 part of a 6% solution of cobalt naphthenate. These impregnated layers were placed in a mold. After standing for 3 hours at room temperature, the product had set to provide a laminate therefrom which was hard and strong.

*Example 10*

Laminates N, O, P, and Q were formed in the following manner: A monomeric mix was provided comprising 96 parts of dichlorostyrene; 4 parts of 55% divinyl benzene containing ethyl vinyl benzene as the principal impurity; and 1 part of dicumyl peroxide.

Fourteen layers of 181 heat-cleaned glass cloth were impregnated with the above mix and cured in a ⅛″ deep mold for 1 hr. at 275° F. The resulting end product was cut in half to form laminates N and O. Laminate O was subjected to a postcure for 2 hrs. at 300° F.

The procedure was repeated with one modification; namely, incorporating 1 part of A-172 silane ester in the monomeric mix. Laminate P was provided, without being subjected to a postcure, as per laminate N above. In contrast, laminate Q was formed by postcuring at similar conditions as described for laminate O. The flexural strength was recorded as indicated in the tabulation herebelow:

|  | N | O | P | Q |
|---|---|---|---|---|
| Flexural strength at room temperature (p.s.i.) | 22,000 | 18,000 | 60,000 | 67,000 |
| Flexural strength, 170° F. | 5,000 | 5,000 | 57,000 | 62,500 |
| Appearance | (1) | (1) | (2) | (2) |
| Flexural strength after immersed 2 hrs. in boiling water | 13,500 | 13,000 | 59,500 | 65,000 |

[1] Very opaque.  [2] Translucent.

This example demonstrates that the strength of a styrene divinyl benzene reinforced plastic is increased about 300% by employing a vinyl silane finishing agent in conjunction with the lamination procedure.

*Example 11*

Styrene, Its Polymers, Copolymers and Derivatives, Boundy and Boyer, supra, p. 725, points out that pure polystyrene has a tensile strength nearly as high as that of any of its copolymers with divinyl benzene; and furthermore, above about 6% of divinyl benzene tensile strength falls off rapidly. These data are as follows:

TENSILE STRENGTH STYRENE—DIVINYL BENZENE COPOLYMERS

Percent DVB: Tensile strength, p.s.i.
0 _____ 6,600
2 _____ 7,100
4 _____max__ 7,400
6 _____ 7,100
8 _____ 5,200
10 _____ 4,200
15 _____ 2,000
20 _____ 1,300

The tensile strengths obtained on various methyl styrene laminates containing various proportions of divinyl benzene as crosslinking agents are summarized below. All were obtained on 14-ply laminates which had been cured in a like manner:

TENSILE STRENGTH OF METHYL STYRENE-DIVINYL BENZENE LAMINATES OF 181-GLASS CLOTH CONTAINING A VINYL SILANE FINISH

| Percent DVB: | Tensile strength, p.s.i. |
|---|---|
| 0 | 28,500 |
| 0.25 | 50,000 |
| 0.50 | 56,000 |
| 2 | 54,000 |
| 5 | 55,500 |
| 10 | 54,000 |
| 20 | 53,000 |

These data show that once a minimum value of about 0.5% divinyl benzene is employed, the tensile strength remains substantially constant when using up to at least 20% divinyl benzene.

Data were obtained with laminates prepared with high dichlorostyrene blends, but the trend was the same as for the methyl styrene.

| Percent DVB: | Tensile strength, p.s.i. |
|---|---|
| 0 | 26,500 |
| 5 | 58,500 |
| 10 | 58,500 |

Whereas in the case of the cast polystyrene, the pure polystyrene exceeded the 10% divinyl benzene copolymer by at least 50% in strength; in the case of the dichlorostyrene laminate, use of 10% divinyl benzene resulted in over 100% greater strength as compared to the laminate when no divinyl benzene was used.

Data on impact strength values of laminates of various styrenes containing varying proportions of divinyl benzene have also indicated that all have higher impact strengths than those containing no divinyl benzene. Boundy and Boyer point out that in case of cast polystyrenes and their divinyl benzene copolymers, the curve follows in general in the shape of that for tensile strength.

FIGURES 1 and 2 represent the corresponding curves for the above data.

*Example 12*

Laminate U was prepared using the following mix:

97 parts of methyl styrene
3 parts of ethylene dimethacrylate
0.25 part of A-172 silane
1.0 part of dicumene peroxide The blend was used for impregnating 14 layers of 181 glass fabric, which had the No. 136 vinyl silane finish. After curing in a mold for one hour at 275° F., it was cut into halves and one-half postcured for 2 hours at 300° F.

A similar laminate, V, was prepared but differed in that only 1% of the dimethacrylate was used instead of 3%. Evaluation data:

FLEXURAL STRENGTH

| Laminate | Postcure | Room Temp. | 170° F. | Test in Water at 170° F. Under Stress* |
|---|---|---|---|---|
| U | None | 61,500 | 54,500 | 1-6½ hrs. |
| U | 2 hours | 66,000 | 61,000 | 1-19 hrs. |
| V | None | 65,500 | 60,500 | 1-24½ hrs. |
| V | 2 hours | 68,000 | 61,000 | 1-16½ hrs. |

*First hour at 75 lbs. total pressure and then increased to 100 lbs.

The above data indicate that methacrylate esters of polyhydric alcohols such as ethylene glycol, polyethylene glycol, glycerine, pentaerythritol and the like are very effective crosslinking agents.

*Example 13*

The polyacrylates and methacrylates are also effective for crosslinking dichlorostyrene laminates. A laminate was prepared as in Example 12 except that a 95/5 ratio of dichlorostyrene/ethylene dimethacrylate was used as monomers. An excellent laminate of good clarity was obtained which had a flexural strength of 68,000 p.s.i.

Having described the general nature and specific embodiments of the present invention, the true scope is now particularly pointed out in the appended claims.

What is claimed is:

1. A reinforced plastic comprising:
 (A) glass fibers; and
 (B) a cured resin mix prepared from a resinifiable monomeric mix whose essential components are:
  (1) 0.5 to 25 parts of a polyvinyl aromatic hydrocarbon having the general formula:

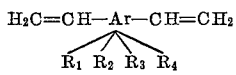

wherein $R_1$, $R_2$, $R_3$ and $R_4$ are each independently selected from the group consisting of hydrogen, halogen, alkyl and vinyl, and Ar is an aromatic nucleus selected from the group consisting of benzene, naphthalene, biphenyl and phenanthrene; and
  (2) 99.5 to 70 parts of a monomeric styrene having the general formula:

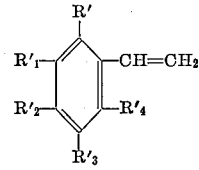

wherein $R'$, $R'_1$, $R'_2$, $R'_3$ and $R'_4$ are each independently selected from the group consisting of hydrogen, halogen and alkyl containing not more than 18 carbon atoms; and
  (3) a peroxide catalyst; and
  (4) 0.1 to 5 parts of an unsaturated organic silane coupling agent having the general formula:

wherein $R''$ is an unsaturated radical selected from the group consisting of vinyl, allyl, methallyl and crotonyl, $n$ is a positive integer selected from the group consisting of 1, 2 and 3, and $R''_1$ is a radical selected from the group consisting of alkyl and aryl.

2. A reinforced plastic as in claim 1 in which at least a portion of the polyvinyl aromatic hydrocarbon component of the resinifiable monomeric mix is replaced by a monomeric unsaturated ester selected from the group consisting of vinyl and allyl esters of polybasic acids, and acrylic and methacrylic acid esters of polyhydric alcohols.

3. A reinforced plastic as in claim 1 wherein the resinifiable monomeric mix contains up to 15 parts by weight, per 100 parts of said monomeric mix, of a rubber selected from the group consisting of natural rubber, polyisoprene, polybutadiene and copolymers of butadiene with styrene.

4. A reinforced plastic pipe comprising glass fibers laid up circumferentially in a plurality of superimposed layers, said layers being bonded with the resinifiable monomeric mix of claim 1, and cured to provide a unitary reinforced plastic pipe.

5. The reinforced plastic pipe of claim 4 wherein the resinifiable monomeric mix contains up to 15 parts by weight, per 100 parts of said monomeric mix, of a rubber selected from the group consisting of natural rubber, polyisoprene, polybutadiene and copolymers of butadiene with styrene.

6. A laminate comprising a plurality of layers of glass fibers impregnated with the resinifiable monomeric mix of claim 1, and cured to provide a unitary reinforced laminate.

7. A laminate as in claim 6 wherein the resinifiable monomeric mix contains up to 15 parts by weight, per 100 parts of said monomeric mix, of a rubber selected from the group consisting of natural rubber, polyisoprene, polybutadiene and copolymers of butadiene with styrene.

8. A method which comprises:
(A) impregnating glass fibers with a resinifiable monomeric mix whose essential components are:
(1) 0.5 to 25 parts of a polyvinyl aromatic hydrocarbon having the general formula:

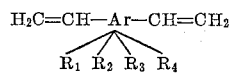

wherein $R_1$, $R_2$, $R_3$ and $R_4$ are each independently selected from the group consisting of hydrogen, halogen, alkyl and vinyl, and Ar is an aromatic nucleus selected from the group consisting of benzene, naphthalene, biphenyl and phenanthrene; and
(2) 99.5 to 70 parts of a monomeric styrene having the general formula:

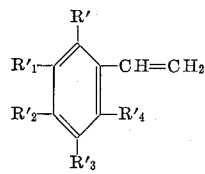

wherein $R'$, $R'_1$, $R'_2$, $R'_3$ and $R'_4$ are each independently selected from the group consisting of hydrogen, halogen and alkyl containing not more than 18 carbon atoms; and
(3) a peroxide catalyst; and
(4) 0.1 to 5 parts of an unsaturated organic silane coupling agent having the general formula:

wherein $R''$ is an unsaturated radical selected from the group consisting of vinyl, allyl, methallyl and crotonyl, $n$ is a positive integer selected from the group consisting of 1, 2 and 3, and $R''_1$ is a radical selected from the group consisting of alkyl and aryl; and
(B) curing the so impregnated fibrous glass reinforcing element to provide a unitary reinforced composition.

9. A method as in claim 8 wherein the glass fibers are initially treated with 0.2 to 0.5%, by weight of the reinforcing element, of the unsaturated organic silane coupling agent in lieu of the unsaturated organic silane coupling agent in the resinifiable monomeric mix.

10. A method as in claim 8 in which at least a portion of the polyvinyl aromatic hydrocarbon component of the resinifiable monomeric mix is replaced by a monomeric unsaturated ester selected from the group consisting of vinyl and allyl esters of polybasic acids, and acrylic and methacrylic acid esters of polyhydric alcohols.

11. A method as in claim 8 wherein the resinifiable monomeric mix contains up to 15 parts by weight, per 100 parts of said monomeric mix, of a rubber selected from the group consisting of natural rubber, polyisoprene, polybutadiene and copolymers of butadiene with styrene.

12. A method of preparing a reinforced plastic pipe which comprises:
(A) circumferentially laying up a plurality of superimposed layers glass fibers to form the peripheral shell of the pipe; and
(B) bonding said layers with a resinifiable monomeric mix whose essential components are:
(1) 0.5 to 25 parts of a polyvinyl aromatic hydrocarbon having the general formula:

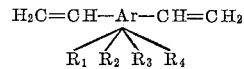

wherein $R_1$, $R_2$, $R_3$ and $R_4$ are each independently selected from the group consisting of hydrogen, halogen, alkyl and vinyl, and Ar is an aromatic nucleus selected from the group consisting of benzene, naphthalene, biphenyl and phenanthrene; and
(2) 99.5 to 70 parts of a monomeric styrene having the general formula:

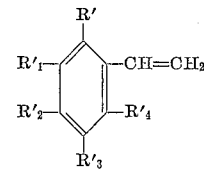

wherein $R'$, $R'_1$, $R'_2$, $R'_3$ and $R'_4$ are each independently selected from the group consisting of hydrogen, halogen and alkyl containing not more than 18 carbon atoms; and
(3) a peroxide catalyst; and
(4) 0.1 to 5 parts of an unsaturated organic silane coupling agent having the general formula:

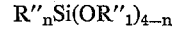

wherein $R''$ is an unsaturated radical selected from the group consisting of vinyl, allyl, methallyl and crotonyl, $n$ is a positive integer selected from the group consisting of 1, 2 and 3, and $R''_1$ is a radical selected from the group consisting of alkyl and aryl; and
(C) curing the resultant structure to provide a unitary reinforced plastic pipe.

13. A method as in claim 12 wherein the glass fibers are initially treated with 0.2 to 0.5%, by weight of the reinforcing element, of the unsaturated organic silane coupling agent in lieu of the unsaturated organic silane coupling agent in the resinifiable monomeric mix.

14. A method as in claim 12 wherein at least a portion of the polyvinyl aromatic hydrocarbon component of the resinifiable monomeric mix is replaced by a monomeric unsaturated ester selected from the group consisting of vinyl and allyl esters of polybasic acids, and acrylic and methacrylic acid esters of polyhydric alcohols.

15. A method as in claim 12 wherein the resinifiable monomeric mix contains up to 15 parts by weight, per 100 parts of said monomeric mix, of a rubber selected from the group consisting of natural rubber, polyisoprene, polybutadiene and copolymers of butadiene with styrene.

References Cited by the Examiner

UNITED STATES PATENTS

| | | | |
|---|---|---|---|
| 2,609,319 | 9/1952 | Boge | 154—83 |
| 2,649,396 | 8/1953 | Witt et al. | 117—126 XR |
| 2,700,185 | 1/1955 | Lee | 260—876 |

MORRIS LIEBMAN, *Primary Examiner.*

K. B. CLARKE, A. LIEBERMAN, *Assistant Examiners.*